United States Patent
Breedvelt-Schouten et al.

(10) Patent No.: US 9,741,151 B2
(45) Date of Patent: Aug. 22, 2017

(54) MOBILE INTERACTIVE COMPARISON CHART

(71) Applicant: International Business Machines Corporation, Armonk, NY (US)

(72) Inventors: Ilse M. Breedvelt-Schouten, Ottawa (CA); Alireza Pourshahid, Ottawa (CA); Maria Gabriela Sanches, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/686,051

(22) Filed: Apr. 14, 2015

(65) Prior Publication Data

US 2016/0307355 A1 Oct. 20, 2016

(51) Int. Cl.
*G06T 11/20* (2006.01)
*G06T 13/80* (2011.01)
*G06F 3/0481* (2013.01)

(52) U.S. Cl.
CPC ............ *G06T 13/80* (2013.01); *G06F 3/0481* (2013.01); *G06T 11/206* (2013.01)

(58) Field of Classification Search
CPC . G06T 11/206; G06T 13/80; G06F 17/30554; G06F 17/30651; G06F 17/30991; G06F 17/30994
USPC .......................... 345/440–440.2; 715/212–220
See application file for complete search history.

(56) References Cited

U.S. PATENT DOCUMENTS

| | | | |
|---|---|---|---|
| 5,623,282 A | 4/1997 | Graham et al. | |
| 6,112,214 A | 8/2000 | Graham et al. | |
| 6,460,059 B1 | 10/2002 | Wisniewski | |
| 6,995,768 B2 | 2/2006 | Jou et al. | |
| 8,176,096 B2 | 5/2012 | Allyn et al. | |
| 8,239,765 B2 | 8/2012 | Alsbury et al. | |

(Continued)

FOREIGN PATENT DOCUMENTS

WO 2012/128650 A1 9/2012

OTHER PUBLICATIONS

List of IBM Patents or Patent Applications Treated As Related, Apr. 29, 2015.

(Continued)

*Primary Examiner* — Jacinta M Crawford
*Assistant Examiner* — Diane Wills
(74) *Attorney, Agent, or Firm* — Shumaker & Sieffert, P.A.

(57) ABSTRACT

An animated visualization of data on an electronic device having a limited display area (such as a mobile device with a touch screen input) is disclosed. The limited display area is partitioned into a thumbnail view of a full data set and an expanded view of a subset of the data that is highlighted within the thumbnail. The views are correspondingly animated such that the highlighted data appears to progressively slide across the thumbnail view such that the full set of data is ultimately displayed in the expanded view. The data displayed in the expanded view is kept in context by dynamically highlighting the corresponding data within the thumbnail view. Various actions are also disclosed, such as pausing/re-starting the animation, selectively pinning data and consolidating coupled data elements—in each case at any time during the animation.

20 Claims, 6 Drawing Sheets

(56) References Cited

U.S. PATENT DOCUMENTS

| | | | |
|---|---|---|---|
| 8,407,737 B1* | 3/2013 | Ellis | H04N 21/4622 |
| | | | 348/569 |
| 8,812,947 B1 | 8/2014 | Maoz et al. | |
| 8,990,727 B2 | 3/2015 | Xia et al. | |
| 2003/0164817 A1 | 9/2003 | Graham et al. | |
| 2008/0072164 A1 | 3/2008 | Park | |
| 2009/0300544 A1 | 12/2009 | Psenka et al. | |
| 2009/0319948 A1 | 12/2009 | Stannard et al. | |
| 2010/0100805 A1 | 4/2010 | Williams et al. | |
| 2012/0023438 A1 | 1/2012 | Xia et al. | |
| 2012/0144325 A1 | 6/2012 | Mital et al. | |
| 2012/0218254 A1 | 8/2012 | Abeln | |
| 2012/0246599 A1 | 9/2012 | Rivas Casado et al. | |
| 2013/0167091 A1 | 6/2013 | Klappert et al. | |
| 2014/0282145 A1 | 9/2014 | Dewan | |
| 2015/0015504 A1* | 1/2015 | Lee | G06F 3/04845 |
| | | | 345/173 |

OTHER PUBLICATIONS

Keim et al. "Visual Analytics: Definition, Process, and Challenges", A. Kerren et al. (Eds.): Information Visualization, LNCS 4950, 2008, pp. 154-175.

Miller et al. "Orchestrating Data, Design, and Narrative: Information Visualization for Sense- and Decision-Making in Online Learning", International Journal of Cyber Behavior, Psychology and Learning, 2(2), Apr.-Jun. 2012, IGI Global, 3 pp.

Notice of Allowance from U.S. Appl. No. 13/835,825, dated Sep. 4, 2015, 21 pp.

Notice of Allowance from U.S. Appl. No. 14/489,038, mailed Mar. 14, 2016, 9 pp.

\* cited by examiner

MOBILE INTERACTIVE COMPARISON CHART

BACKGROUND OF THE INVENTION

The invention relates to the visualization of data on an electronic device having a limited display area and more specifically to the visualization of data on a mobile device having a limited display area.

There is an increasing demand for software applications for mobile devices that enable real-time and on-the-go access to data. One significant challenge faced by designers and developers of data-rich applications for devices having a limited display area is balancing the need to preserve a "big picture" view of the data while facilitating the comparison of data element details that may not be visible within the limited display area available.

DETAILED DESCRIPTION

By way of introduction, the following description will show various embodiments of the present invention facilitating the visualization and analysis of data displayed on the screen of an electronic device. Conventional devices, components, techniques and other functional and individual components thereof that are understood by one of ordinary skill in the art may not be described in detail herein. However, specifics are in other cases provided merely for ease of explanation and/or understanding the various embodiments and possible variations thereof.

Figure 1:
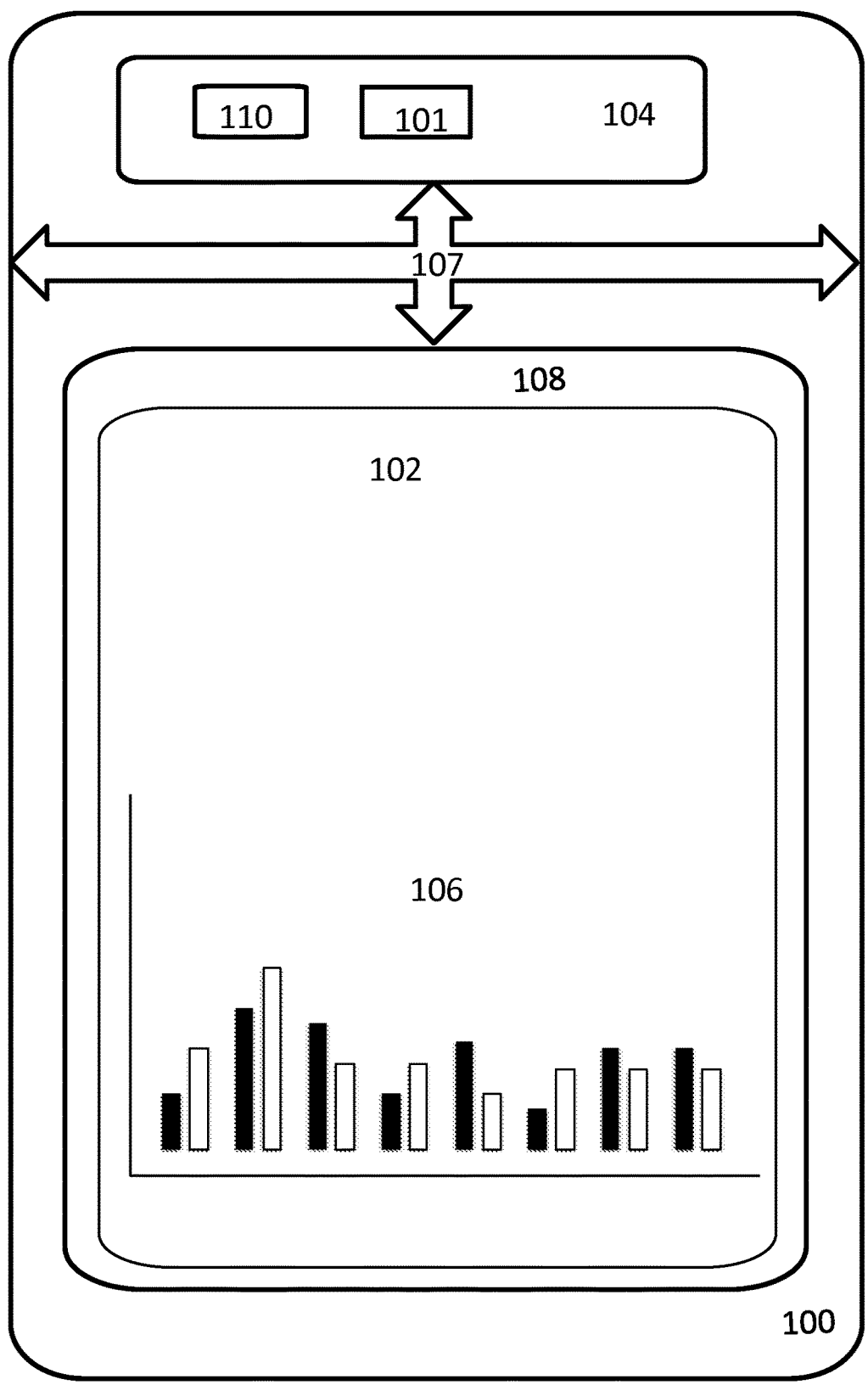
FIG. 1 illustrates an example of a mobile device in accordance with the present invention.

FIG. 1 illustrates an example of an electronic device having a limited display area in accordance the present invention, i.e., mobile device 100. By way of example only, electronic devices having a limited display area in accordance with the present invention include, without limitation: handheld devices such as cellular phones, mobile phones, smart phones (generally considered to have more advanced computing ability through native software applications), gaming devices, personal digital assistants, and tablets. A more specific but non-exhaustive list of such handheld devices includes those available from consumer electronics manufacturers such as such as Samsung, Nokia, Apple, ZTE, LG, Huawei, Lenovo, Sony Mobile Communications, Microsoft, Google and Motorola.

As depicted, mobile device 100 has a display 108 of substantially planar and limited viewing area, a touch screen 102 user interface, processor/memory module 104 and a conventional software application that when executing on processor/memory module 104, renders data visualizations, by way of example only, such as of bar chart 106. The software application is adapted in this example to incorporate certain features of a mobile interactive comparison chart 101 in accordance with the present invention. As is known, display 108 may be embodied, without limitation, as a liquid crystal display (LCD), a light emitting diode (LED) display, an organic light emitting diode (OLED) display or any other suitable electronic display. The display 108 and touch screen 102 are communicatively coupled to the processor/memory module 104 via bus 107. Bus 107 generally supports the transfer of data, commands, and other information between various subsystems of mobile device 100 and may also support external communications through a network interface (not shown). Examples of bus 107 include but are not limited to a general system bus, a dedicated system bus, multiple buses arranged in hierarchical or other form, or any other suitable bus, bus network, switch fabric, or interconnection technology. Examples of network interfaces include but are not limited to a physical/wired connection (such as a universal serial bus (USB) port), adapted for the input and output of information (instructions and/or data) with other devices connected through the USB port to mobile device 100. A network interface may also implement various conventional wireless protocols (such as are described in various IEEE standards specifications) to communicate through network 150 to other devices.

As is known, touch screen 102 can be realized as a transparent resistive touch panel, a capacitive touch panel, or other known sensing technology such as surface acoustic wave sensors, or other technologies and responsive to the proximity (or touching) of an input object (such as the user's finger (e.g., input 300, FIG. 3), a stylus, a digital pen, or any other suitable input object) to the surface of the screen. In this example, touch screen 102 is aligned parallel to the planar viewing area of display 108 and is integral with, proximate to and interposed in the line-of-sight between the user and the display 108 such that touch screen 102 transparently overlaps and/or overlies display 108 and the content rendered on display 108.

The processor/memory module 104 generally represents the hardware, software, and/or firmware components configured to collectively perform functions of a mobile interactive comparison chart 101 in accordance with the present invention. By way of example only, the processor/memory module 104 may include one or a combination of conventional general or special purpose processors (not depicted), including by way of example only, microprocessors, co-processors, graphics processors, digital signal processors, single or multi-core processors, multiple processing chips on one die, and/or multiple dies on one package or substrate. As is known, processor/memory module 104 may be implemented as an integrated device (sometimes referred to as a microcontroller or system on a chip (SoC)), which includes peripheral interface(s) and other functional components, by way of example only, such as: logic and/or circuitry configurable through: software/firmware embedded within the processor(s); computer readable program instructions stored in memory 110 and executed on the processor(s); programmable logic circuitry, such as field-programmable gate arrays (FPGA), and/or programmable logic arrays (PLA); or any suitable combination of the foregoing that configures the electronic device to perform one or more functions herein.

The processor/memory module 104 typically includes an operating system (not depicted) for performing functions, such as interface, memory and multiple task management. Examples of operating systems (OS) compatible with mobile device 100 include, without limitation: the iOS® family of operating systems available from Apple® Inc., and the Android® family of operating systems currently maintained and developed by Google Inc.

Processor/memory module 104 can be conventionally programmed to read from memory 110, load and execute computer instructions corresponding to a compatible operating system, application program code (including mobile interactive comparison chart 101), data structures, data files, and other types of data. In some embodiments, various computer programs, software applications, modules, or other software elements executing on mobile device 100 may include a so-called web browser. As is known, content may be rendered by such programs, applications, modules, elements such as within the web browser or executed in association with conventional technology, including by way of example only, any suitable release, version or combination of: HTML, CSS, JavaScript, XML, AJAX and JSON.

Memory 110 communicates with the processor of processor/memory module 104 through portions of bus 107. Memory 110 may be implemented as physical, tangible, non-transitory machine-readable storage medium/media (also referred to as computer readable storage medium/media—including but not limited to one or more hardware, firmware, or software implementations or any combination thereof—that can retain and store computer readable instructions for execution by processor/memory module 104 or any other suitable instruction execution device(s). In some embodiments, the execution of such computer readable instructions by processor/memory module 104 can implement one or more features of mobile interactive comparison chart 101. By way of example only, memory 110 can be viewed as one or more persistent data storage and/or temporary (volatile) data storage devices. A non-exhaustive list of persistent data storage devices includes, without limitation, one or more (internal or external): solid state drives/circuits, memory cards/devices, flash drives, hard disc drives, optical disc drives, magnetic tape drives, or any combination of the foregoing. A non-exhaustive list of examples of volatile memory include but are not limited to, random-access memory (RAM), dynamic random access memory (DRAM), buffer memory, flash memory, and cache memory. As is known, a volatile memory may require periodical electrical refreshing to maintain the integrity of the contents stored in memory 110. Those skilled in the art will recognize that a temporary (volatile) storage device also constitutes a physical, tangible, non-transitory computer-readable data storage device, notwithstanding that program code may be loaded, stored, buffered, or cached on the temporary (volatile) storage device for a relatively short duration or only in a volatile memory format.

Although memory 110 is depicted as a single monolithic entity, as is known, memory 110 may be arranged in a hierarchy of caches in mobile device 100 and/or in other memory devices, in a single physical location, or distributed across a plurality of physical systems or subsystems in various forms. While memory 110 is depicted as a component that is distinct from the processor of processor/memory module 104 and other elements of mobile device 100, memory 110 may include any intermediate or cache memory at any location throughout mobile device 100, including cache memory proximate to or integrated with processor(s) of processor/memory module 104 or individual cores of such processor(s). As is known, the computer readable instructions may be partially or entirely stored: elsewhere in mobile device 100 and communicated to memory 110 as needed prior to execution via bus 107 or any other suitable local means; external to mobile device 100 and communicated to mobile device 100 via any other suitable remote means and thereafter to memory 110.

It can be seen from FIG. 1 that when the display 108 area of an electronic device is limited such as for mobile device 100, considerable time and effort may be required for users of software applications to interpret data sets such as are represented by bar chart 106. For example, when the size of the bar chart 106 is reduced so that the entire chart is visible on the display 108 (as depicted), the details of the data elements are correspondingly reduced in size such that they can be difficult if not impossible (for practical purposes) to read. On the other hand, if one expands the chart to make details of data elements more visible, the "big picture" can be lost. Moreover, providing a manual scrolling capability can be distracting and a user can easily forget that certain portions of an expanded bar chart are not visible. For example, it can become time consuming and tedious to compare data elements or subsets of data elements, for example, where such data elements or subsets may not be located near one another on a limited area display 108.

As will be discussed further with reference to FIGS. 2-6, mobile interactive comparison tool 101 may ease such difficulties. As will be described in more detail with reference to FIG. 2, some embodiments of mobile interactive comparison tool 101 divide the limited area of display 108, where: a first partition provides a thumbnail view of a full set of data elements within bar chart 106; and a second partition provides an expanded view of a predetermined subset of less than all data elements within the thumbnail view. As will be described in more detail with reference to FIGS. 2-4, other embodiments of mobile interactive comparison tool 101 include features for animating the bar chart. For example, the subset of data elements within the expanded view can be animated such that the entire bar chart 106 may ultimately be displayed within the expanded view. The big picture context is maintained by dynamically highlighting those data elements within the thumbnail view that correspond to the subset of data elements displayed in the animated expanded view. As will be described in more detail with reference to FIGS. 3-5, still other embodiments of mobile interactive comparison tool 101 include features for: selectively pinning (or freezing) and/or consolidating data elements at any time during the animation; and dynamically pausing (and re-starting) the animation. For convenience and by way of example only, the following discussion with reference to FIGS. 2-6 will assume the use of a conventional transparent touch screen 102 that overlies and is aligned parallel to the planar viewing area of display 108.

Figure 2:
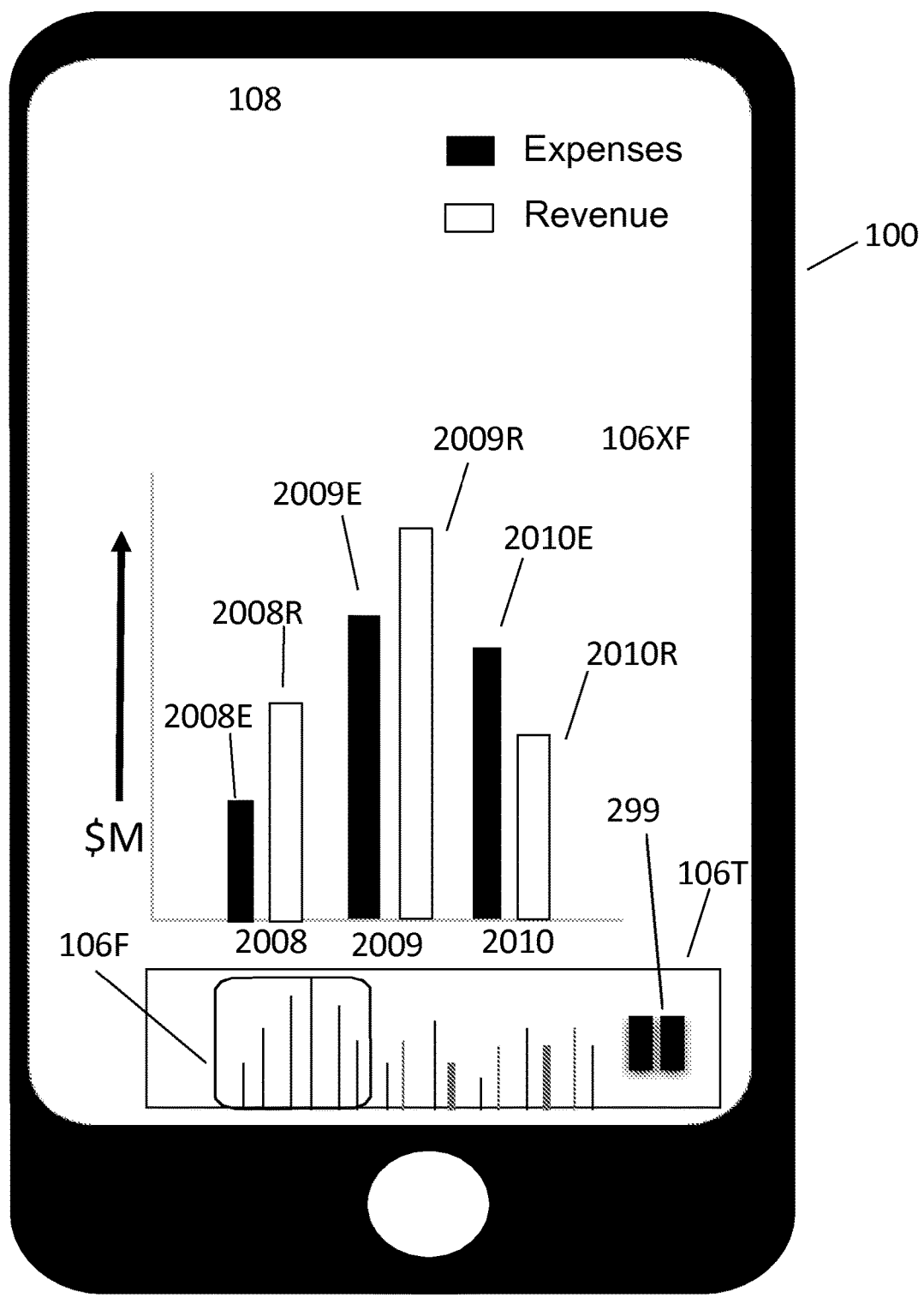
FIG. 2 illustrates a more detailed example of the mobile device depicted in FIG. 1.

As depicted in FIG. 2, conventional techniques can be used to divide the limited area of display 108 of mobile device 100 into what may be variously known or referred to as areas of focus/views/partitions/windows/portals, etc., for example: thumbnail view 106T of bar chart 106, area of focus 106F within thumbnail view 106T, and expanded area of focus 106XF, which is an expanded (or magnified) view of the data elements within area of focus 106F. Thus, expanded area of focus 106XF can magnify (and thus make visible) certain details that were not visible within area of focus 106F. By way of example only, the x-axis (time/year) data element labels 2008, 2009, 2010 and the y-axis data label $M (millions of dollars) representing the values corresponding to the annual amounts of Expenses (2008E, 2009E, 2010E) and Revenue (2008R, 2009R, 2010R) are now visible. Thus, the multiple partition/view features of mobile interactive comparison tool 101 can collectively expose details of bar chart 106 data within the expanded area of focus 106XF while visually maintaining the overall context within thumbnail 106T.

Figure 3:
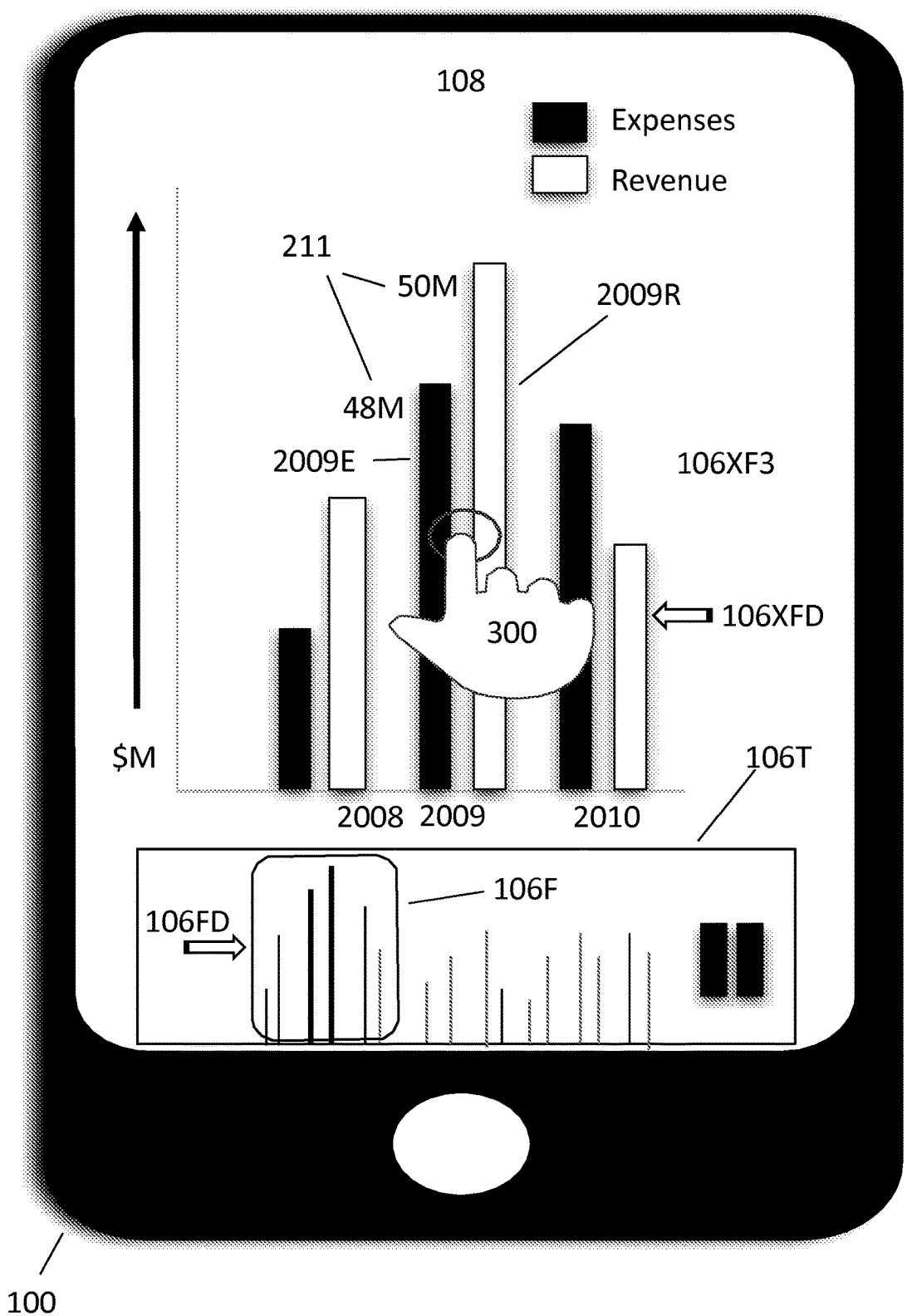
FIG. 3 illustrates an example of mobile device data element animation and pinning features in accordance with the present invention.
Figure 4:
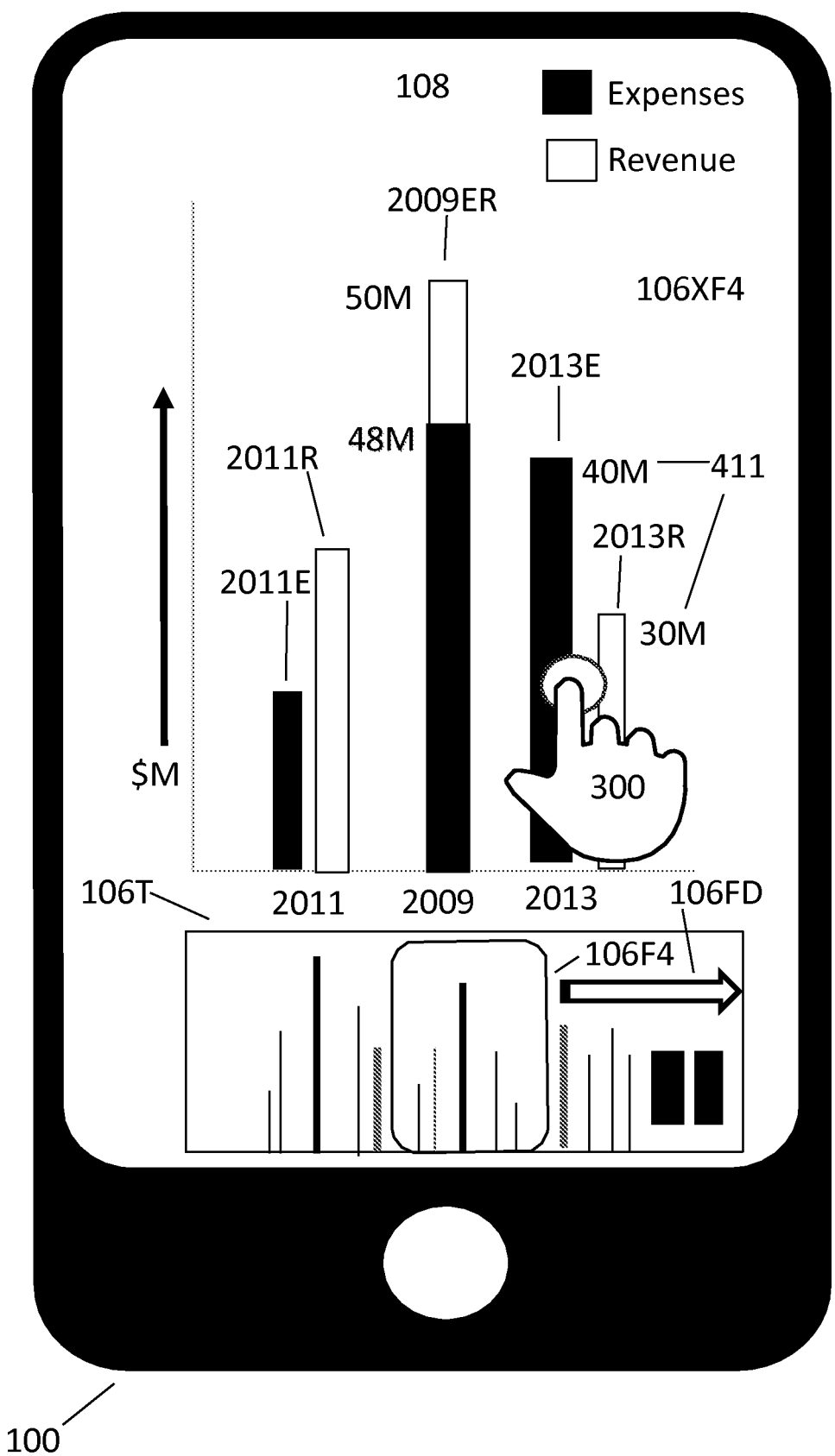
FIG. 4 illustrates another example of mobile device data element animation and consolidation features in accordance with the present invention.

FIG. 3 exemplifies additional features of mobile interactive comparison tool 101 on mobile device 100. As will be discussed in more detail with reference to FIG. 4, area of focus 106F can be animated to appear as sliding in direction 106FD while the data elements then within area of focus 106F are correspondingly visualized as sliding across expanded view 106XF3 in direction 106XFD. Referring specifically now to FIG. 3, an example of a "pinning" feature for one or more animated data elements of mobile interactive comparison tool 101 will now be described. As depicted, contact is detected between input 300 and display 108 in an area corresponding to the location of coupled data elements 2009E and 2009R. In response to such contact, coupled data element(s) 2009E and 2009R are pinned/frozen in place and held in the foreground of expanded area of focus 106XF3. Other device feedback can also be provided, e.g., by highlighting the pinned/frozen data within thumbnail 106T that corresponds to the pinned data segment(s) and/or making additional data details visible in expanded area of focus 106XF3 e.g., labels 211 corresponding to the y-axis values of the pinned/coupled data segment(s) 2009E and 2009R. In some embodiments, mobile interactive comparison tool 101 provides features for releasing pinned/frozen data element(s). For example, the detection of a second contact by input 300 to the aforementioned pinned/coupled data elements(s) 2009E and 2009R, can result in the release of the coupled data elements from the previously pinned/frozen state. The mobile interactive comparison tool 101 could then refresh the display 108 to correspond to a state of animation prior to the pinning of the data element. As will be discussed in more detail with reference to FIG. 4, mobile interactive comparison tool 101 may also include features for consolidating pinned/coupled data element(s) such as 2009E and 2009R, by overlaying them.

FIG. 4 illustrates another example of data animation features in accordance with the present invention. Specifically, the location of area of focus 106F4 in thumbnail 106T exemplifies a snapshot of a time after animation features of mobile interactive comparison tool 101 have operated to slide area of focus 106F (FIG. 3) in direction 106FD to the current location at depicted area of focus 106F4. Such animation features in this example of mobile interactive comparison tool 101 also illustrate the results of the corresponding animated/dynamic sliding of the data elements within expanded area of focus 106XF4 in direction 106XFD (FIG. 3) to display an expanded view of the data element subset now depicted in FIG. 4 as within area of focus 106F4. More specifically, in this example: coupled data elements 2011E and 2011R (corresponding to the respective Expenses and Revenues for the year 2011) are depicted as having slid from right to left in expanded view 106XF4 such that they now are adjacent to (the left of) pinned/consolidated data element 2009ER (discussed in more detail below); and coupled data elements 2013E and 2013R, which correspond to the Expenses and Revenue for the year 2013, are now also within area of focus 106F4 and are correspondingly shown as adjacent to (the right of) pinned/consolidated data element 2009ER. The data elements corresponding to Expenses and Revenue for year 2012 have correspondingly slid behind pinned/consolidated data element 2009ER and thus are not shown.

FIG. 4 also illustrates examples of additional features of mobile interactive comparison tool 101. For purposes of this example, referring now to FIG. 3, we will assume that within some predefined time after an initial contact 300, which resulted in the pinning/freezing of coupled data elements 2009E and 2009R, a second contact by input 300 (not depicted) is detected to now pinned data elements 2009E and 2009R. Referring now to FIG. 4, such second contact can result in the consolidation of the aforementioned coupled/pinned data elements into depicted pinned/consolidated data element 2009ER. FIG. 4 also depicts contact by input 300 to an area of display 108 corresponding to the location of the coupled data elements 2013E and 2013R. In this example, the results follow those for coupled data elements 2009E and 2009R (FIG. 3), i.e., the coupled data elements 2013E and 2013R are pinned/frozen in place on display 108. As was discussed previously with reference to FIG. 3, additional device feedback can also be provided with regard to newly pinned data segments, such as labels 411 (FIG. 4), which correspond to the Expense and Revenue (y-axis) values of the pinned/coupled data elements 2013E and 2013R.

Figure 5:
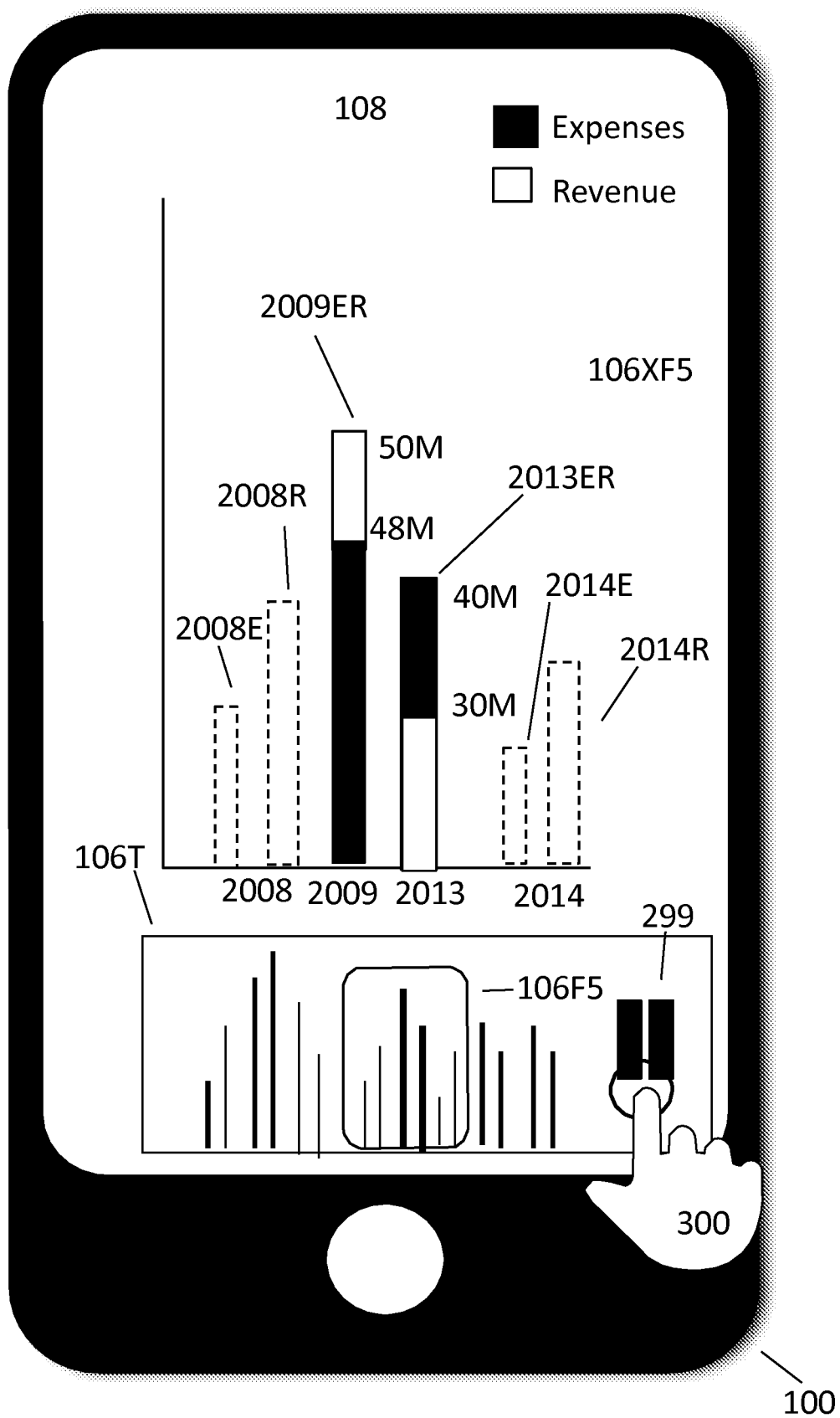
FIG. 5 illustrates a further example of mobile device data element animation and pause/resume features in accordance with the present invention.

FIG. 5 illustrates additional features of mobile device 100 embodying mobile interactive comparison tool 101 in accordance with the present invention. In this example, pinned/consolidated data element 2013ER represents the results of a second contact by input 300 (FIG. 4) to data elements 2013E and 2013R (FIG. 4). Referring again to FIG. 5, input 300 is also depicted as making initial contact with display 108 in an area within thumbnail view 106T corresponding to pause button 299. In this example, the initial contact pauses (stops) the animation on the display 108 and any subsequent contact(s) to pause button 299 will "toggle" the animation on and off. In other words, a first contact with pause button 299 can result in the animation action of views 106F5 and 106XF5 to pause and a subsequent contact with pause button 299 will resume/restart the animation, and so on. In some embodiments the speed and/or direction of the animation can be dynamically controlled by user input to a "fast-forward" and "rewind" action buttons (not depicted). Referring again to FIG. 5, additional device feedback in the form of additional context for affected data elements can be provided. In this example, coupled data elements 2008E and 2008R corresponding to the Expenses and Revenues for 2008 are visualized immediately to the left of pinned/consolidated data element 2009ER and coupled data elements 2014E and 2014R corresponding to the Expenses and Revenues for 2014 are visualized to the right of pinned/consolidated data element 2013ER.

It can be seen that the aforementioned examples show how mobile interactive comparison tool 101 may make the process of interacting with and the understanding and analysis of a data set (such as bar chart 106) on a device having a limited display area, simpler, faster and more user friendly.

Figure 6:
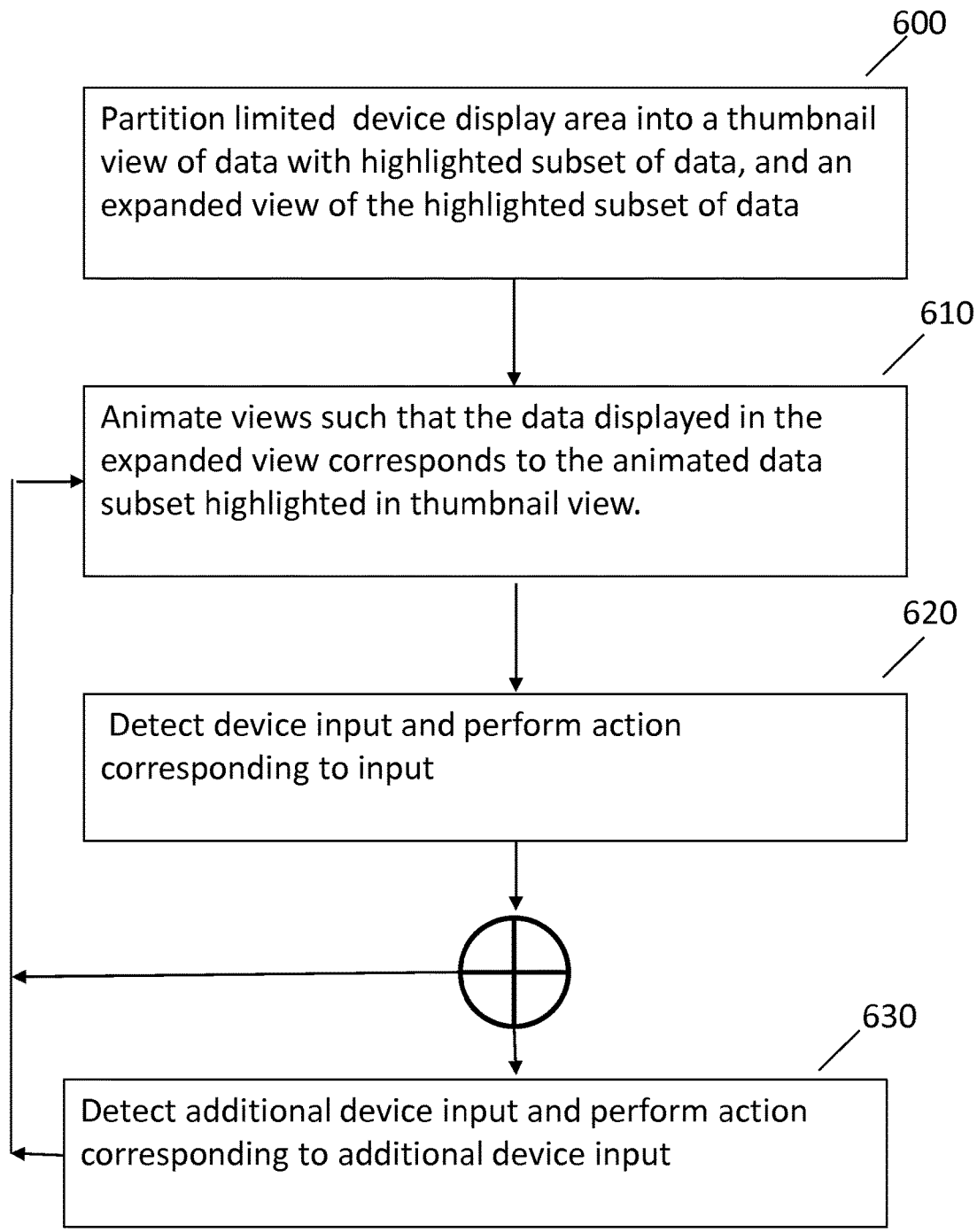
FIG. 6 illustrates an example of a computer implemented method in accordance with the present invention.

FIG. 6 illustrates (with reference to FIGS. 1-5) an example of a computer implemented method in accordance with the present invention. In step 600 (with reference to FIG. 2), the limited display area of mobile device 100 is partitioned into: a thumbnail view 106T of the full set of data elements, wherein a subset of the data elements are highlighted 106F within the thumbnail view; and an expanded view 106XF of the highlighted data subset 106F.

In step 610, (with reference now to FIG. 3) the views within the expanded view 106XF3 and highlighted data subset 106F within thumbnail view 106T are correspondingly animated such that highlighted data subset 106F is visualized as sliding in direction 106FD and the data displayed in the expanded view 106XF3 is visualized as sliding in direction 106XFD to dynamically display the animated data subset 106F highlighted within thumbnail view 106T.

In step 620, (with reference now to FIGS. 1, and 3-5), an input to mobile device 100 is detected and the predefined action corresponding to the detected input is performed. For example, where mobile device 100 includes a touch screen 102 (FIG. 1) and input 300 (FIG. 3) is detected in an area corresponding to the location of coupled data elements 2009E and 2009R of display 108, coupled data element(s) 2009E and 2009R can be pinned/frozen in expanded area of focus 106XF3. As was discussed in more detail with regard to FIG. 4, the animation features (step 610) can continue with regard to non-pinned data elements. As was discussed in more detail with regard to FIG. 5, if the input is detected as corresponding to pause button 299 (FIG. 5), the animation features of the present invention can be paused until an input gesture is detected as resuming the animation (step 610).

In step 630, (with reference now to FIGS. 1, and 3-5), the input gesture to touch screen 102 (FIG. 1) results in additional action being performed. As was discussed with reference to FIG. 5, if an input 300 gesture results (at least initially) in the pausing of the animation, a completion of the input gesture, such as determined by the detection of a subsequent contact (not depicted) to pause button 299, can result in the resumption of the animation and the process returns to step 610. In another example, discussed with reference FIG. 4, such additional input can result in the consolidation of data elements into consolidated data element 2009ER (FIG. 4). Depending on the input detected and corresponding action—by way of example and without limitation: pin, pause/resume, consolidate, fast-forward, rewind, etc.—the display 108 can be refreshed to a desired state and/or the process returned to step 610 and the animation continued or resumed with regard to some or all of the data elements depicted in one or more views.

As will be appreciated by those skilled in the art, aspects of the present invention may be embodied, for example, as one or more of a computer implemented method, device, system, and/or computer program product. Accordingly, aspects of the present invention may take the form of an entirely hardware embodiment, an entirely software embodiment (including firmware, resident software, micro-code, etc.) or an embodiment combining software and hardware, any of which may be referred to herein as a "circuit," "module" or "system." Furthermore, aspects of the present invention may take the form of a computer program product embodied in one or more computer-readable data storage devices or computer-readable data storage components/medium(s) having computer readable program code embodied thereon. For example, a computer-readable data storage device may be embodied as any tangible non-transitory data storage medium capable of retaining and storing instructions for processing by an instruction execution device. Examples of such computer readable storage medium(s) include but are not limited to, an electronic storage device, a magnetic storage device, an optical storage device, an electromagnetic storage device, a semiconductor storage device, or any suitable combination of the foregoing. A non-exhaustive list of more specific examples of computer readable storage medium(s) includes: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective electronic devices from a computer readable storage medium or other external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective electronic device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The computer readable program instructions may be provided to a processor of a general purpose computer, special purpose computer, or other programmable data processing apparatus such that the execution of the instructions by the processor or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto mobile device 100, other programmable data processing apparatus, or other electronic device to cause a series of operational steps to be performed on the mobile device, other programmable apparatus or other electronic device to produce a computer implemented method, such that the executed instructions implement the functions/acts specified in the flowchart and/or block diagram block or blocks.

The block diagrams and flowchart in FIGS. 1-6 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have illustrated examples of architecture, functionality, and the operation of various embodiments of devices, methods, and computer program products in accordance with of the present invention, but are not intended to be exhaustive or limited to the embodiments disclosed. For example, the visualizations described with reference to FIGS. 2-6, such as the depiction of areas of focus 106F (FIGS. 2-3), 106F4 (FIG. 4), 106F5 (FIG. 5) and thumbnail view 106T (FIGS. 2-4) as outlined by frames, are provided for simplicity and ease of description/illustration only. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. In this regard, each block in the flowchart or block diagrams may represent a module, segment, or portion of computer executable instructions for implementing the corresponding logical function(s). It is understood that the functions noted in a given block (or step) may occur in a different order from the examples described in the Detailed Description and Drawings. For example, two blocks shown in succession may, in fact, be executed substantially concurrently (and vice versa), or the blocks may sometimes be executed in the reverse order, depending upon the functionality involved. It is also understood that a block (and/or combination of blocks) of the block diagrams and/or flowcharts can be implemented by special purpose hardware-based systems and/or combinations of such hardware with computer instructions that perform the specified functions or process steps.

What is claimed is:

1. A method comprising:
   outputting, by one or more processors of an electronic device, for display on a touch screen of the electronic device, a first partition of a display area of the touch screen, and a thumbnail view within the first partition, wherein the thumbnail view comprises a representation of a full set of data elements;
   outputting, by the one or more processors for display on the touch screen, a highlighting of a subset of data elements from among the full set of the data elements displayed within the thumbnail view, wherein the highlighting is animated to progress in motion through the first partition, thereby highlighting progressively adjacent subsets of the data elements, thereby defining a highlighted subset of the data elements at each point in time;
   outputting, by the one or more processors for display on the touch screen, a second partition of the display area such that the second partition comprises an expanded view of the highlighted subset of the data elements, wherein the second partition is animated to display an expanded view of the highlighted subset of data elements as the highlighting progresses, such that the data elements in the second partition are displayed in motion across the second partition corresponding to the motion of the highlighting through the first partition;
   detecting, by the one or more processors, a first input to the touch screen corresponding to a location of coupled data elements from among the data elements within the expanded view; and
   outputting, by the one or more processors for display on the touch screen, in response to the detecting of the first input, a modified display in which the coupled data elements are displayed as a pinned set of data elements that remains stationary in a foreground of the expanded view while other data elements continue to be displayed in motion across the second partition corresponding to the motion of the highlighting through the first partition.

2. The method of claim 1, further comprising:
   outputting, for display on the touch screen, an image of a pause button;
   detecting an input to an area of the touch screen corresponding to a location of the pause button;
   pausing the animated progress of the highlighting through the first partition and the motion of the data elements in the second partition, in response to the detecting of the input to the area of the touch screen corresponding to the location of the pause button;
   detecting a second input to the area of the touch screen corresponding to a location of the pause button; and
   resuming the animated progress of the highlighting through the first partition and the motion of the data elements in the second partition in response to the detecting of the second input to the area of the touch screen corresponding to a location of the pause button.

3. The method of claim 1, further comprising:
   detecting a second input corresponding to the location of the pinned set of data elements within the expanded view; and
   outputting for display, in response to the detecting of the second input, a modified view in which the pinned set of data elements are consolidated into a consolidated data element in which the pinned set of data elements are overlaid.

4. The method of claim 1, further comprising:
   detecting a second input to the touch screen corresponding to a location of the pinned set of data elements; and
   outputting for display, in response to the detecting of the second input, a modified view in which the pinned set of data elements are displayed in motion together with surrounding portions of the expanded view at a new position relative to the surrounding portions of the expanded view at which the pinned set of data elements was disposed at a time of the second input.

5. The method of claim 1, wherein the electronic device comprises a mobile device.

6. The method of claim 1, wherein the data elements comprise chart elements indicative of business data.

7. The method of claim 6, wherein the chart elements indicative of business data comprise chart elements indicative of at least one or more of revenue and expenses.

8. The method of claim 1, wherein the data elements are initially ordered in a time-ordered sequence indicative of data collected in a time-ordered sequence.

9. A computer program product comprising a computer-readable storage medium having program code embodied therewith, the program code executable by at least one processor to cause an electronic device to:
   output, for display on a touch screen of the electronic device, a first partition of a display area of the touch screen, and a thumbnail view within the first partition, wherein the thumbnail view comprises a representation of a full set of data elements;
   output, for display on the touch screen, a highlighting of a subset of data elements from among the full set of the data elements displayed within the thumbnail view, wherein the highlighting is animated to progress in motion through the first partition, thereby highlighting progressively adjacent subsets of the data elements, thereby defining a highlighted subset of the data elements at each point in time;
   output, for display on the touch screen, a second partition of the display area such that the second partition comprises an expanded view of the highlighted subset of the data elements, wherein the second partition is animated to display an expanded view of the highlighted subset of data elements as the highlighting progresses, such that the data elements in the second partition are displayed in motion across the second partition corresponding to the motion of the highlighting through the first partition;
   detect a first input to the touch screen corresponding to a location of coupled data elements from among the data elements within the expanded view; and
   output, for display on the touch screen, in response to the detecting of the first input, a modified display in which the coupled data elements are displayed as a pinned set of data elements that remains stationary in a foreground of the expanded view while other data elements continue to be displayed in motion across the second partition corresponding to the motion of the highlighting through the first partition.

10. The computer program product of claim 9, wherein the program code is further executable by the at least one processor to cause the electronic device to:
   output, for display on the touch screen, an image of a pause button;
   detect an input to an area of the touch screen corresponding to a location of the pause button;
   pause the animated progress of the highlighting through the first partition and the motion of the data elements in the second partition, in response to the detecting of the input to the area of the touch screen corresponding to the location of the pause button;
   detect a second input to the area of the touch screen corresponding to a location of the pause button; and
   resume the animated progress of the highlighting through the first partition and the motion of the data elements in the second partition in response to the detecting of the second input to the area of the touch screen corresponding to a location of the pause button.

11. The computer program product of claim 9, wherein the program code is further executable by the at least one processor to cause the electronic device to:
   detect a second input corresponding to the location of the pinned set of data elements within the expanded view; and
   output for display, in response to the detecting of the second input, a modified view in which the pinned set of data elements are consolidated into a consolidated data element in which the pinned set of data elements are overlaid.

12. The computer program product of claim 9, wherein the program code is further executable by the at least one processor to cause the electronic device to:
   detecting a second input to the touch screen corresponding to a location of the pinned set of data elements; and
   outputting for display, in response to the detecting of the second input, a modified view in which the pinned set of data elements are displayed in motion together with surrounding portions of the expanded view at a new position relative to the surrounding portions of the expanded view at which the pinned set of data elements was disposed at a time of the second input.

13. The computer program product of claim 9, wherein the program code is further executable by the at least one processor to cause the electronic device to:
   detect a second input to the touch screen corresponding to a location of a second set of coupled data elements from among the data elements within the expanded view; and
   output, for display on the touch screen, in response to the detecting of the second input, a newly modified display in which the second set of coupled data elements are displayed as a second pinned set of data elements that remains stationary in a foreground of the expanded view adjacent to the first pinned set of data elements.

14. The computer program product of claim 9, wherein the data elements comprise chart elements indicative of at least one or more of revenue and expenses.

15. The computer program product of claim 9, wherein the data elements are initially ordered in a time-ordered sequence indicative of data collected in a time-ordered sequence.

16. The computer program product of claim 9, wherein the program code is further executable by the at least one processor to cause the electronic device to:
   detect a second input to the touch screen corresponding to a location of a second set of coupled data elements from among the data elements within the expanded view; and
   output, for display on the touch screen, in response to the detecting of the second input, a newly modified display in which the second set of coupled data elements are displayed as a second pinned set of data elements that remains stationary in a foreground of the expanded view adjacent to the first pinned set of data elements.

17. A device comprising:
   one or more processors;
   a touch screen operatively coupled to the one or more processors for receiving outputs from the one or more processors for display on the touch screen and for providing detections of inputs to the one or more processors; and one or more memory or data storage components operatively coupled to the one or more processors and having executable instructions loaded or stored thereon for execution by the one or more processors, thereby configuring the one or more processors to:

output, for display on the touch screen, a first partition of a display area of the touch screen, and a thumbnail view within the first partition, wherein the thumbnail view comprises a representation of a full set of data elements;

output, for display on the touch screen, a highlighting of a subset of data elements from among the full set of the data elements displayed within the thumbnail view, wherein the highlighting is animated to progress in motion through the first partition, thereby highlighting progressively adjacent subsets of the data elements, thereby defining a highlighted subset of the data elements at each point in time;

output, for display on the touch screen, a second partition of the display area such that the second partition comprises an expanded view of the highlighted subset of the data elements, wherein the second partition is animated to display an expanded view of the highlighted subset of data elements as the highlighting progresses, such that the data elements in the second partition are displayed in motion across the second partition corresponding to the motion of the highlighting through the first partition;

detect a first input to the touch screen corresponding to a location of coupled data elements from among the data elements within the expanded view; and output, for display on the touch screen, in response to the detecting of the first input, a modified display in which the coupled data elements are displayed as a pinned set of data elements that remains stationary in a foreground of the expanded view while other data elements continue to be displayed in motion across the second partition corresponding to the motion of the highlighting through the first partition.

18. The device of claim 17 wherein the one or more processors are further configured to:
detect a second input corresponding to the location of the pinned set of data elements within the expanded view; and
output for display, in response to the detecting of the second input, a modified view in which the pinned set of data elements are consolidated into a consolidated data element in which the pinned set of data elements are overlaid.

19. The device of claim 17, wherein the one or more processors are further configured to:
detect a second input to the touch screen corresponding to a location of the pinned set of data elements; and
output for display, in response to the detecting of the second input, a modified view in which the pinned set of data elements are displayed in motion together with surrounding portions of the expanded view at a new position relative to the surrounding portions of the expanded view at which the pinned set of data elements was disposed at a time of the second input.

20. The device of claim 17, wherein the one or more processors are further configured to:
detect a second input to the touch screen corresponding to a location of a second set of coupled data elements from among the data elements within the expanded view; and
output, for display on the touch screen, in response to the detecting of the second input, a newly modified display in which the second set of coupled data elements are displayed as a second pinned set of data elements that remains stationary in a foreground of the expanded view adjacent to the first pinned set of data elements.

* * * * *